(12) United States Patent
Chen-Ho et al.

(10) Patent No.: US 12,001,038 B2
(45) Date of Patent: *Jun. 4, 2024

(54) PATTERNED WAVELENGTH-SELECTIVE FILM (71) Applicant: 3M INNOVATIVE PROPERTIES COMPANY, St. Paul, MN (US)

(72) Inventors: Kui Chen-Ho, Woodbury, MN (US); Douglas S. Dunn, Woodbury, MN (US); Tien Yi T. H. Whiting, St. Paul, MN (US); Bryan T. Whiting, St. Paul, MN (US); Taylor J. Kobe, Woodbury, MN (US); Anthony F. Schultz, Forest Lake, MN (US); Duane D. Fansler, Dresser, WI (US); Jonah Shaver, St. Paul, MN (US); John A. Wheatley, Stillwater, MN (US); Susannah C. Clear, Hastings, MN (US); Daniel J. Theis, Mahtomedi, MN (US); John T. Strand, Stillwater, MN (US); Thomas J. Metzler, St. Paul, MN (US); Kevin W. Gotrik, Hudson, WI (US); Scott J. Jones, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 669 days.

This patent is subject to a terminal disclaimer.

(21) Appl. No.: 17/261,983

(22) PCT Filed: Jul. 23, 2019

(86) PCT No.: PCT/IB2019/056302
§ 371 (c)(1),
(2) Date: Jan. 21, 2021

(87) PCT Pub. No.: WO2020/021459
PCT Pub. Date: Jan. 30, 2020

(65) Prior Publication Data
US 2022/0113457 A1    Apr. 14, 2022

Related U.S. Application Data (60) Provisional application No. 62/702,672, filed on Jul. 24, 2018.

(51) Int. Cl.
G02B 5/26      (2006.01)
G02B 5/124     (2006.01)
G02B 5/20      (2006.01)

(52) U.S. Cl.
CPC ............. *G02B 5/26* (2013.01); *G02B 5/124* (2013.01); *G02B 5/208* (2013.01)

(58) Field of Classification Search
None
See application file for complete search history.

(56) References Cited

U.S. PATENT DOCUMENTS 1,591,572 A   7/1926  Stimson
3,190,178 A   6/1965  McKenzie
(Continued)

FOREIGN PATENT DOCUMENTS

CN  102820093   12/2012
JP  H08152511    6/1996
(Continued)

OTHER PUBLICATIONS

International Search Report for PCT International Application No. PCT/IB2019/56302, dated Dec. 20, 2019, 3 pages.

*Primary Examiner* — Jennifer D. Carruth (57) ABSTRACT

The disclosed patterned wavelength-selective material and process for making the patterned wavelength-selective material uses patterned applied adhesive and a structurally weak wavelength-selective material that includes portions (Continued)

that contact the adhesive and break to remain in contact with the adhesive. In one embodiment, the wavelength-selective material comprises an array of sections with cuts at least partially through a wavelength-selective film at each section secured to the adhesive. In another embodiment, the wavelength-selective film comprises a transfer stack of layers.

14 Claims, 4 Drawing Sheets

(56) References Cited

U.S. PATENT DOCUMENTS

| | | | |
|---|---|---|---|
| 3,700,305 A | 10/1972 | Bingham | |
| 4,025,159 A | 5/1977 | McGrath | |
| 4,588,258 A | 5/1986 | Hoopman | |
| 4,775,219 A | 10/1988 | Appledorn | |
| 5,066,098 A | 11/1991 | Kult | |
| 5,138,488 A | 8/1992 | Szczech | |
| 5,450,235 A | 9/1995 | Smith | |
| 5,557,836 A | 9/1996 | Smith | |
| 6,024,455 A * | 2/2000 | O'Neill | G02B 5/124 359/530 |
| 6,565,697 B1 | 5/2003 | Maercklein | |
| 6,883,908 B2 | 4/2005 | Young | |
| 8,647,463 B2 | 2/2014 | Yamazaki et al. | |
| 8,865,293 B2 | 10/2014 | Smithson | |
| 9,289,962 B2 | 3/2016 | Chen-Ho et al. | |
| 9,581,740 B2 | 2/2017 | Smithson | |
| 9,746,590 B2 | 8/2017 | Agashe | |
| 2002/0142121 A1 | 10/2002 | Hingsen-Gehrmann | |
| 2005/0153107 A1 | 7/2005 | Iijima | |
| 2006/0234040 A1 | 10/2006 | Liu | |
| 2007/0082963 A1 | 4/2007 | Bhatt | |
| 2008/0198461 A1 | 8/2008 | Nomura | |
| 2010/0277801 A1 | 11/2010 | Nakajima | |
| 2016/0200086 A1 | 7/2016 | Dolezal | |
| 2017/0293056 A1 | 10/2017 | Chen-Ho | |
| 2021/0286111 A1 * | 9/2021 | Chen-Ho | G02B 5/208 |

FOREIGN PATENT DOCUMENTS

| | | |
|---|---|---|
| JP | 2009245915 | 10/2009 |
| JP | 2014205247 | 10/2014 |
| WO | WO 1995-017692 | 6/1995 |
| WO | WO 1996-035196 | 11/1996 |
| WO | WO 2017-034879 | 3/2017 |
| WO | WO 2017-132055 | 8/2017 |
| WO | WO 2018-064198 | 4/2018 |
| WO | WO 2018-064208 | 4/2018 |
| WO | WO 2018-064212 | 4/2018 |
| WO | WO 2018-178802 | 10/2018 |
| WO | WO 2018-178803 | 10/2018 |
| WO | WO 2019-084302 | 5/2019 |
| WO | WO 2020-021419 | 1/2020 |
| WO | WO 2020-021458 | 1/2020 |

* cited by examiner

PATTERNED WAVELENGTH-SELECTIVE FILM

CROSS REFERENCE TO RELATED APPLICATIONS

This application is a national stage filing under 35 U.S.C. 371 of PCT/IB2019/056302, filed Jul. 23, 2019, which claims the benefit of Provisional Application No. 62/702,672, filed Jul. 24, 2018, the disclosure of both applications is incorporated by reference in their entirety herein.

TECHNICAL FIELD

The present disclosure relates to a patterned wavelength-selective film, a method of making a patterned wavelength-selective film, and a light directing article with a patterned wavelength-selective film.

BACKGROUND

Wavelength selective materials can be used to impart an image on a substrate, such as, for example a bar code. U.S. Pat. No. 8,865,293 discloses embedding infrared-detectable images on a light directing film. Light directing articles have an ability to manipulate incoming light and typically include an optical element such as a bead or prism. Retroreflective articles are light directing articles that include at least a retroreflecting element. Retroreflective elements reflect incident light back towards the direction of the light source. Retroreflecting elements include cube-corner prismatic retroreflectors and beaded retroreflectors. Retroreflective articles are used for road signs, license plates, and pavement markings because they are visibly apparent to the driver in daytime and nighttime when illuminated by the vehicle. Placement of detectable images on a retroreflective film allows for the embedded images to be seen in both daytime and nighttime conditions.

SUMMARY

Wavelength-selective films are visibly apparent under the selective wavelength. Wavelength-selective films typically reflect off axis, absorb, or scatter the selected wavelength and therefore can provide high-contrast against a background when applied in a pattern on a substrate. However, it is difficult to apply unique patterned embedded images from film. Disclosed is a cost-effective method and construction of applying a patterned wavelength-selective film to a substrate. In some embodiments, the substrate is a retroreflective film or the substrate is applied to a retroreflective film. When the patterns of wavelength-selective films are used on a retroreflective film, the high contrast allows the pattern to be detected in both daytime and nighttime.

The disclosed patterned wavelength-selective material and process for making the patterned wavelength-selective material use patterned applied adhesive and a structurally weak wavelength-selective material that includes portions that contact the adhesive and break to remain in contact with the adhesive.

In one embodiment, a process for making a patterned wavelength-selective film comprises providing a substrate, providing a wavelength-selective film, applying adhesive in a pattern between the substrate and the wavelength-selective film, breaking portions of the wavelength-selective film at the adhesive to form patterned portions of the wavelength-selective film on the substrate. In one embodiment, the substrate is an optically active film. In one embodiment, the optically active film is a retroreflective film.

In one embodiment the process further comprises applying a protective layer to the substrate. In one embodiment, the patterned portions of the wavelength selective film are between the protective layer and the substrate. In one embodiment, the substrate is a transparent layer applied to a retroreflective film. In one embodiment, the substrate is a carrier film. In one embodiment, the process further comprises applying heat or pressure to transfer the adhesive from the carrier film to a second substrate.

In one embodiment, the wavelength-selective film is transparent in the visible light spectrum. In one embodiment, the wavelength-selective film reflects, absorbs or scatters in a wavelength outside the visible light spectrum. In one embodiment, the wavelength-selective film reflects, absorbs or scatters in the infrared (IR) or near infrared light spectrum.

In one embodiment, the wavelength-selective film is structurally weak. In one embodiment, the adhesion between the wavelength-selective film and the patterned adhesive is greater than the force keeping the wavelength-selective film intact. In one embodiment, the wavelength-selective film comprises an array of sections with cuts extending at least partially through a thickness of a wavelength-selective film at each section secured to the adhesive. In one embodiment, the cuts comprise perforation cuts partially or entirely through the thickness of the wavelength-selective film. In one embodiment, the cuts comprise kiss cuts at least partially through the thickness of the wavelength-selective film. In one embodiment, the cuts are continuous or discontinuous along an extending surface of the wavelength-selective film.

In one embodiment, the wavelength-selective film comprises a transfer stack of layers comprising a release layer comprising a metal layer or doped semi-conductor layer, an acrylate layer overlaying the release layer, a wavelength-selective layer overlaying the acrylate layer, wherein a release value between the acrylate layer and the metal layer or doped semiconductor layer is from 2 to 50 grams per inch.

In one embodiment, the patterned adhesive is in a unique pattern. In one embodiment, the patterned adhesive is applied to the substrate. In one embodiment, the patterned adhesive is applied to the wavelength-selective film. In one embodiment, the patterned adhesive is a pressure sensitive adhesive. In one embodiment, the patterned adhesive is heat activated. In one embodiment, the process further comprises laminating the adhesive to a second substrate.

In one embodiment, the process further comprises capturing a continuous edge of the wavelength-selective film with the portions of the wavelength-selective film broken at the patterned adhesive as it is removed. In one embodiment, the process further comprises applying an encapsulation adhesive surrounding the patterned adhesive and wavelength-selective film.

In one embodiment, a patterned wavelength-selective film comprises a substrate, an adhesive at a first region of the substrate, array of sections with cuts at least partially through a thickness of a wavelength-selective film at each section secured to the adhesive.

In one embodiment, the substrate is a protective layer applied to a retroreflective film. In one embodiment, the patterned portions of the wavelength selective film are between the protective layer and the retroreflective film. In one embodiment, the patterned film further comprises an encapsulation adhesive surrounding the patterned adhesive and wavelength-selective film. In one embodiment, the substrate is a retroreflective film. In one embodiment, the wavelength-selective film is transparent in the visible light spectrum. In one embodiment, the wavelength-selective film reflects, absorbs, or scatters in the infrared and near infrared light spectrum. In one embodiment, the cuts are a set of perforation cuts partially or entirely through the thickness of the wavelength-selective film. In one embodiment, the patterned adhesive is in a unique pattern.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

The light directing article 100 has a substrate 200 with an adhesive 300 at a first area 112 and a wavelength-selective film 400 applied to the adhesive 300. Therefore, the wavelength-selective film 400 forms a pattern 112 on the light directing article 100. Second area 114 does not include the wavelength-selective film 400.

Figure 1A:
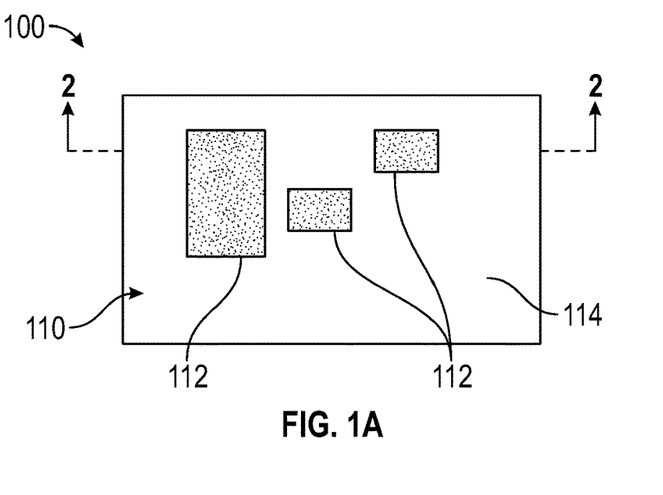
FIG. 1A is a front view of one embodiment of a light directing article comprising a substrate with a patterned wavelength-selective film apparent in a first lighting condition.

FIG. 1a is a front view of one embodiment of a light directing article 100 with a wavelength-selective film 400 in a pattern 112 on the first major surface 110 of a substrate 200. The lighting conditions in FIG. 1a are the matching wavelength to achieve a response from the wavelength-selective film 400 and provide contrast between the wavelength-selective film 400 in the pattern 112 and the second area 114 that does not include the wavelength-selective film 400. In one embodiment, the wavelength-selective film 400 is responsive in the infrared or near infrared light spectrum. In one embodiment, the wavelength-selective film 400 is responsive in the ultraviolet light spectrum.

Figure 1B:
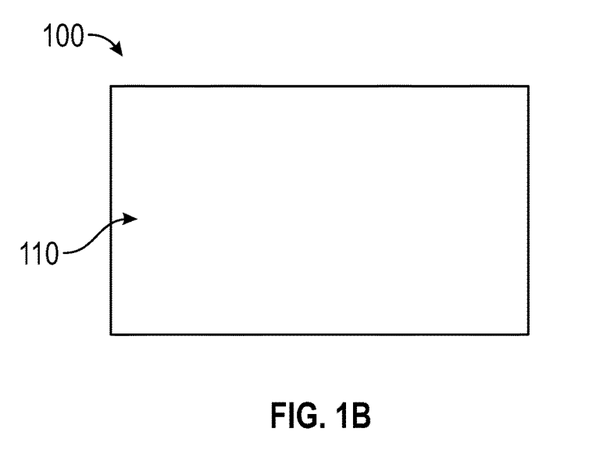
FIG. 1B is a front view of the patterned wavelength-selective film from FIG. 1a with the wavelength-selective film not apparent in a second lighting condition.

FIG. 1b is a front view of the light directing article 100 from FIG. 1a under a different lighting condition than shown in FIG. 1a. In this embodiment, the lighting condition is not a matching wavelength to achieve a response from the wavelength-selective film 400 and therefore the pattern area 112 with the wavelength-selective film 400 is not distinctly apparent from the second area 114 that does not include the wavelength-selective film 400. In one embodiment, the lighting condition in FIG. 1b is in the visible light spectrum. In one embodiment, the wavelength-selective film 400 is transparent in the visible light spectrum.

The substrate 200 that supports the wavelength-selective film 400 can be any known material for supporting the wavelength-selective film 400 such as rigid or flexible paper, films, foil, plastics, metals, or composite materials. In one embodiment, the substrate 200 is an optically active substrate. An optically active substrate manipulates light, and in some instances, comprises optical elements. Some examples of optical elements include glass or ceramic bead, prisms, cube corner elements, microlenses, and other microstructured elements. For example, in one embodiment, the substrate 200 is retroreflective and therefore generally directs incoming light back towards the direction of the light source. A retroreflective substrate will return incoming light to improve the detectability of the pattern formed by the first areas 112 with improved contrast between the first areas 112 with the wavelength-selective material 400 and the second areas 114 without the wavelength-selective material.

An example is described for the embodiment shown in FIGS. 1a and 1b, in the case that if the substrate 200 is retroreflective and the wavelength-selective film 400 is visibly transparent and IR-reflective. When the light directing article 100 is exposed to an infrared light source as shown in FIG. 1a, the IR light at the second areas 114 retroreflects back to the light source so that the second areas 114 appear bright, while the first areas 112 containing the wavelength-selective film appear dark since the IR light at the first areas 112 is reflected off-axis by the wavelength-selective film and not returned back towards the direction of the light source. Under visible light conditions, as shown in FIG. 1b, the visible light passes substantially through the wavelength-selective film and is retroreflected over the whole surface of the light directing article 100 making the light directing article appear uniformly bright in the retroreflected light.

Figure 2:
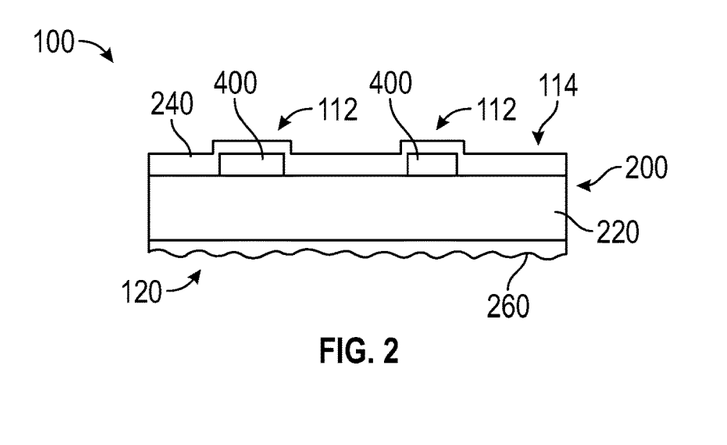
FIG. 2 is a side sectional view of the substrate with the patterned wavelength-selective film of FIG. 1A through line 2-2.

FIG. 2 is a side sectional view of the light directing article 100 of FIG. 1a through line 2-2. The light directing article 100 includes a substrate 200 with the patterned wavelength-selective film 400 at the first area 112 on the first major surface 110 of the light directing article 100. Second area 114 on the first major surface 110 of the light directing article 100 does not include the wavelength selective film 400. Substrate 200 in this embodiment comprises an optically active substrate 220, such as a retroreflective material. An adhesive 300, not shown in FIG. 2, is used to secure the wavelength-selective film 400 to the light directing article, as will be discussed in more detail in the embodiments shown in figures below.

As shown in FIG. 2 an optional securing adhesive 260 may be included on the second major surface 120 of the light directing article 100 to secure the light directing article 100 to another object. Optionally, a protective layer 240 may be at the outermost surface of the light directing article 100. As shown in FIG. 2, the wavelength-selective film 400 is protected from possible damage by being positioned between the substrate 200 and the protective layer 240.

Figure 3:
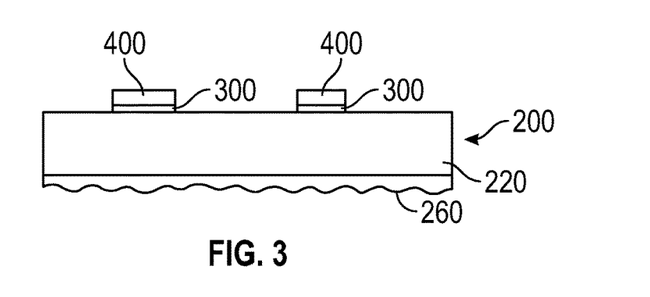
FIG. 3 is a side sectional view of one embodiment of a substrate with a patterned adhesive and patterned wavelength-selective film, wherein in this embodiment the substrate is retroreflective.

FIG. 3 is a side sectional view of one embodiment of a light directing article 100 of FIG. 1a through line 2-2 with the adhesive 300 between the substrate 200 and the wavelength-selective film 400. In this embodiment, substrate 200 comprises an optically active substrate 220.

Figure 4:
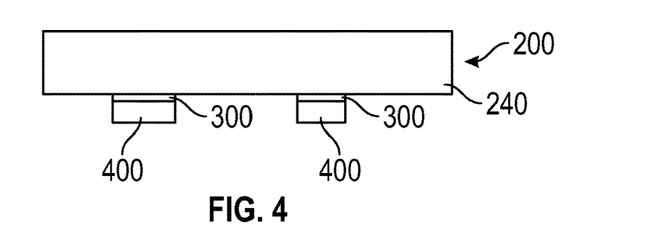
FIG. 4 is a side sectional view of one embodiment of a substrate with a patterned adhesive and patterned wavelength-selective film, wherein in this embodiment the substrate is a film.
Figure 5:
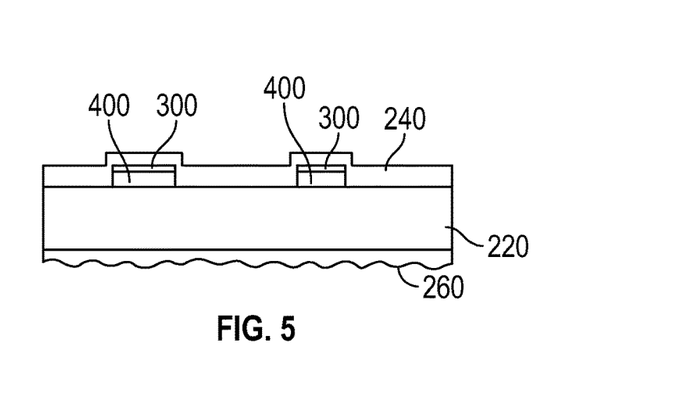
FIG. 5 is a side sectional view of the substrate from FIG. 4 applied to a retroreflective substrate.

FIG. 4 is a side sectional view of one embodiment of a light directing article 100 of FIG. 1a through line 2-2. In this embodiment, substrate 200 is a transparent layer 240, which is substantially transparent in the wavelength range that corresponds with the wavelength-selective film 400. In some instances, the transparent layer 240 is a protective layer protecting the underlying materials from elements such as ultraviolet light, mechanical damage, water encroachment. The adhesive 300 is between the transparent layer 240 and the wavelength-selective film 400. Typically, in a construction such as shown in FIG. 4, the transparent layer 240 containing the wavelength-selective film 400 is applied to another substrate. For example, FIG. 5 is a side sectional view of the substrate from FIG. 4 applied to another substrate 220, which may be an optically active substrate such as a retroreflective substrate. A securing adhesive layer (not shown) may be included between the wavelength-selective film 400 and the substrate 220 to secure the wavelength-selective film 400 to the substrate 220.

Figure 6:
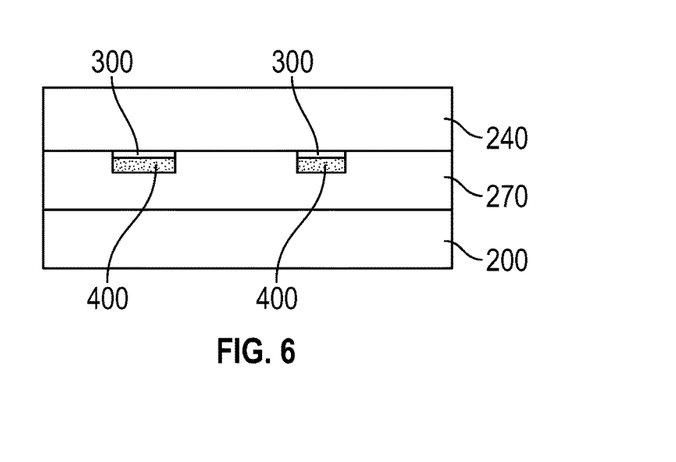
FIG. 6 is a side sectional view of the substrate of FIG. 4 with an encapsulation adhesive surrounding the wavelength-selective film.

The securing adhesive layer can be a continuous or patterned adhesive layer. The securing adhesive layer can be an encapsulation adhesive. FIG. 6 is a side sectional view of one embodiment of a light directing article 100 of FIG. 4 where the adhesive 300 and the wavelength-selective film 400 are encapsulated into an adhesive layer 270, followed by application of the substrate 200.

Figure 7:
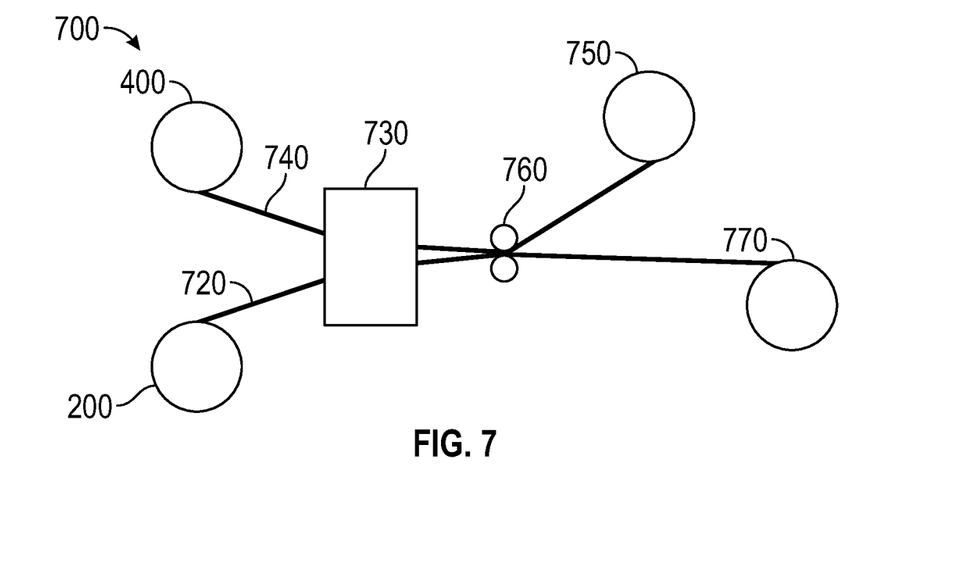
FIG. 7 is a side sectional view of one embodiment of a process for making a substrate with a patterned wavelength-selective film.

FIG. 7 is side sectional view of one embodiment of a process for making a substrate 200 with a patterned wavelength-selective film 400. The substrate 200 and wavelength selective film 400 are provided. An adhesive application station 730 applies the adhesive 300 onto one of the wavelength-selective film 400 or the substrate 200. Adhesive application can be by any number of known adhesive pattern coating techniques. For example, if a regular repeating pattern of adhesive 300 is desirable, then any pattern coating or printing process such as rotary printing, gravure printing, screen printing, or flexographic printing can be used to apply the adhesive 300 to either the wavelength-selective film 400 or the substrate 200. In one embodiment, it may be desirable to create unique patterns of adhesive 300. Therefore, a digital printing process such as ink jet printing can be used to apply the adhesive 300 to either the wavelength-selective film 400 or substrate 200.

Following application of the adhesive 300 to one of the wavelength-selective film 400 or substrate 200, the wavelength-selective film 400 and substrate 200 come into contact at a nip 760. Following the nip 760, a return wavelength selective film 750 of the wavelength selective film 400 separates from the combined wavelength-selective film 400, substrate 200 and adhesive 300. Portions of the wavelength-selective film 400 break and remain secured to the adhesive 300. A patterned substrate return film 770 containing the substrate 200, adhesive 300, and portions of the wavelength-selective film 400 is formed and collected.

The wavelength-selective film 400 is structurally weak so portions will break when adhered to the adhesive 300. The relative adhesion of the wavelength-selective film 400 to the adhesive 300 it contacts is a greater force than the force to keep the wavelength-selective film 400 intact.

Figure 8:
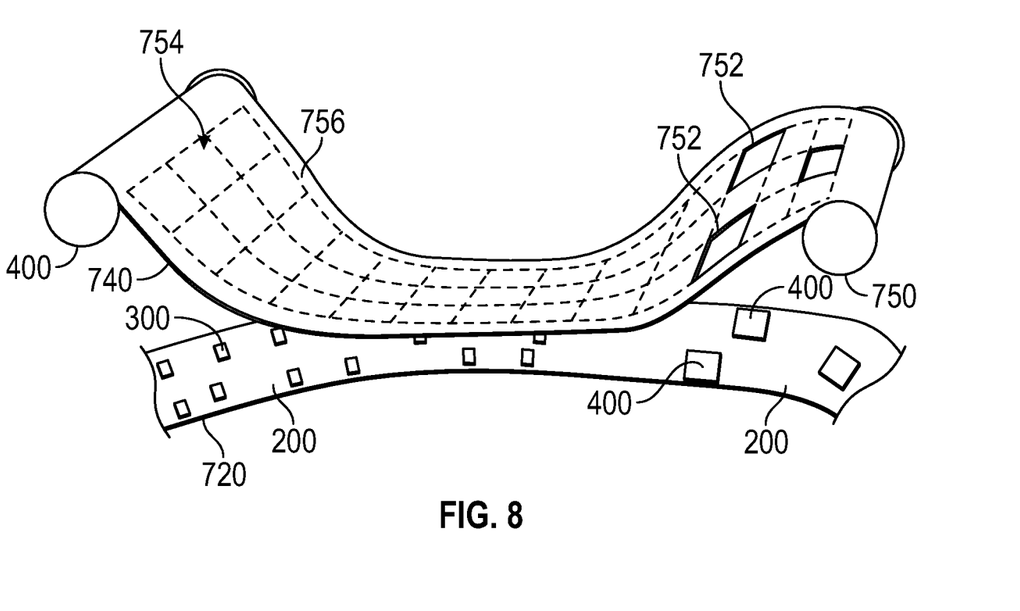
FIG. 8 is a perspective view of one embodiment of a process for making a substrate with a patterned wavelength-selective film, wherein the wavelength-selective feed film includes an array of sections.

In some instances, a physical cut may be needed to weaken the wavelength-selective film 400. FIG. 8 is a perspective view of one embodiment of a process for making a substrate 200 with a patterned wavelength-selective film 400, wherein the wavelength-selective film 400 comprises a plurality of cut sections 754 to substantially weakens the structure of the wavelength-selective film 400. FIG. 8 shows the wavelength-selective film 400 combining with the substrate film 200 at a nip (however the nip rollers are not shown in this image). In one embodiment, the cut sections 754 may be continuous or discontinuous along the extending surface of the wavelength-selective film 400. For example, FIG. 8 shows discontinuous cut sections 754 in the extending surface of the wavelength-selective film 400. In one embodiment, the cut sections 754 may extend partially or entirely through the thickness of the wavelength-selective film 400. Following joining of the substrate 200, adhesive 300, and wavelength-selective film 400, break portions 752 of the wavelength-selective film 400 will separate from the return wavelength-selective film 750 and remain secured to the adhesive 300 and substrate 200. Typically, at least one side of the wavelength-selective film 400 maintains a continuous edge 756 so that the return wavelength-selective film 750 has a portion to maintain continuity for winding.

The embodiment shown in FIG. 8, shows adhesive 300 applied to portions of the substrate 200 prior to the combination of the wavelength-selective film 400, adhesive 300, and substrate 200. It is understood that as described above, the adhesive 300 can be applied instead to portions of the wavelength-selective film 400 and then the coated wavelength-selective film 400, adhesive 300, and substrate 200 can be combined as shown in FIG. 8.

In one embodiment, the wavelength-selective film 400 may be delivered by a transporting film, which may be secured together by an adhesive or a static force. A transporting film can aid in processing and handling of the wavelength-selective film 400. If a transporting film is provided, then the adhesion between the wavelength-selective film 400 and the transporting film is less than the adhesion between the wavelength-selective film 400 and the adhesive 300 to allow for transfer of the wavelength-selective film to the adhesive 300. In one embodiment, the peel adhesion between the adhesive 300 and the wavelength-selective film is at least 5 ounces per inch (oz/in), 15 oz/in, 25 oz/in, 35 oz/in, 45 oz/in, 55 oz/in greater than the peel adhesion between the wavelength-selective 400 and transporting film.

Figure 9:
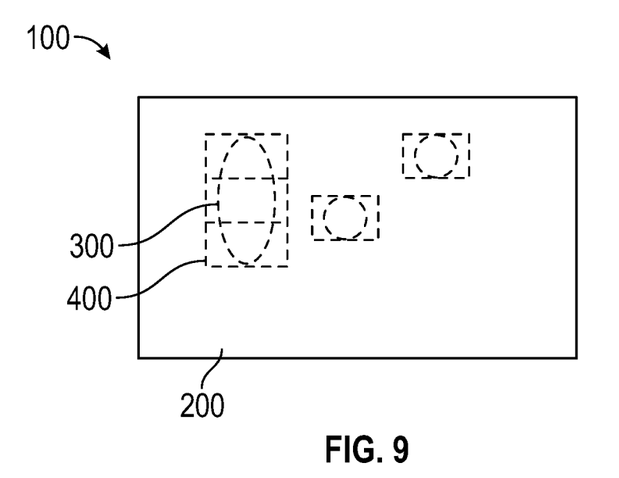
FIG. 9 is a front view of one embodiment of a substrate with a patterned wavelength-selective film apparent in a first lighting condition, showing an underlying patterned adhesive and the sections of the array of the wavelength-selective material secured by the patterned adhesive.

FIG. 9 is a front view of one embodiment of a substrate 200 with a wavelength-selective film 400 formed from the process described in FIG. 8 and shows the underlying adhesive 300. As can be seen, selective application of the adhesive 300 combined with the substrate 200 and break portions 752 of the wavelength-selective film 400 can form a pattern 112 of the wavelength-selective film 400. As can be seen, in some instances the break portion 752 of the wavelength-selective film 400 is larger than the underlying adhesive 300. In some instances, the break portion 752 comprises of the wavelength-selective film with an array of sections with cuts (not shown) at least partially through the thickness of the wavelength-selective film 400, so that each section is smaller than the underlying adhesive 300.

Figure 10:
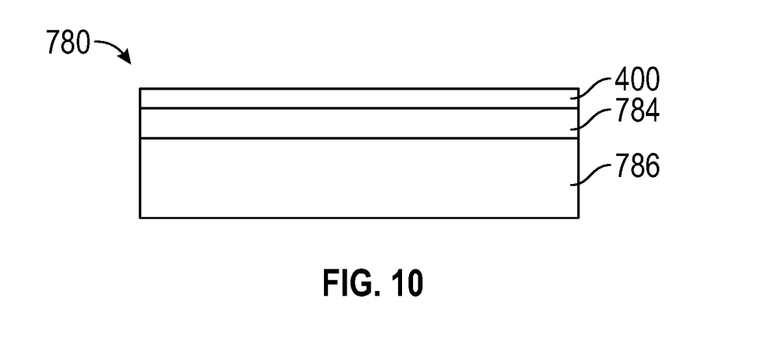
FIG. 10 is a side sectional view of one embodiment of a transfer film for use as the wavelength-selective feed film in a process such as shown in FIG. 7.

Another embodiment of a wavelength-selective film 400 that is structurally weak so portions will break when adhered to the adhesive 300 is a transfer article 780. FIG. 10 is a side sectional view of one embodiment of a transfer article 780 for use as the wavelength-selective film in a process such as shown in FIG. 7. The transfer articles 780 are described in PCT patent application titled "Transfer Articles" PCT/IB2018/051832 filed on Mar. 19, 2018, and PCT patent application titled "Transfer Articles" PCT/IB2018/051833, the disclosures of which are herein incorporated by reference.

The transfer article 780 comprises a release layer 786, wherein the release layer 786 comprises a metal layer or a doped semiconductor layer; a first acrylate layer 784 overlaying the release layer 786; and a function layer 400 overlaying the first acrylate layer; wherein a release value between the release layer 786 and the first acrylate layer 784 is from 2 to 50 grams per inch. The function layer 400 is the wavelength-selective film. The function layer 400 can be very thin and easily breakable. In some embodiments, the function layer 400 is 0.03 to 5 microns thick. In some embodiments, the function layer 400 is 0.03 to 2 microns thick. In some embodiments, the function layer 400 is 0.03 to 1 micron thick. In these cases, the transfer article 780 is inherently structurally weak and does not need additional physical cuts to detach a pattern of the function layer 400.

In one embodiment, the transfer article 780 is the input wavelength-selective film 400 used in the process described in FIG. 7. Adhesive 300 is applied to the wavelength-selective film 400 layer of the transfer article or applied to the substrate 200. At the nip 760 the wavelength-selective film 400, adhesive 300, and substrate 200 are in contact. Then the transfer article 780 is separated. A portion of the wavelength-selective film 400 removes from the transfer article 780 and secures to the adhesive 300 resulting in the patterned wavelength-selective film 400 such as shown in FIG. 1a.

In one embodiment, the wavelength-selective film 400 is a film coated or embedded with wavelength-selective material, such as, for example, pigments, dyes, pearlescent pigments, coated mica, surface coated ceramic beads, or other materials with light absorbing, reflecting, or scattering properties.

Multiple cost-efficient advantages can be obtained with the structurally weak wavelength-selective film 400 such as the transfer article or the wavelength-selective film with an array of sections with cuts, wherein each section is smaller than the underlying adhesive 300. For example, it is not necessary to register the application of the adhesive 300 to the break portions of the structurally weak wavelength-selective film 400 to form the desired pattern. As described, the wavelength-selective film 400 will break and align with the location of the applied adhesive 300 to form the desired pattern.

It is understood that more than one wavelength-selective material can be used on any one particular light directing article 100. For example, in one embodiment a first wavelength-selective film that is responsive in a first light spectrum, such as infrared light, and visibly transparent can be used in one portion of the light directing article 100, and a second wavelength-selective film that is responsive in a second light spectrum, such as ultraviolet light, and visibly transparent can be used on either the same areas or a different area of the light directing article 100.

Wavelength-selective film may be any film design to provide a response at a given wavelength. In one embodiment, the wavelength-selective film 400 maybe infrared-reflecting material, for example, a multilayer optical film. The multi-layer optical film chosen for any specific implementation will depend on the desired optical, structural, and durability characteristics. As such, desirable multi-layer optical films will vary based on the intended application. Some exemplary multi-layer optical films are described in, for example, U.S. Pat. No. 6,024,455 and PCT Publication No. WO 95/17692. Exemplary commercially available multi-layer optical films include, for example, 3M Solar Reflective Film, manufactured by 3M Company of St. Paul. The transmission spectrum of a particular multi-layer optical film depends, in part, on the optical thickness of the individual layers along the various axes, and is substantially determined by the well-known Fresnel coefficient. Films can be designed to reflect infrared, visible, or ultraviolet light by choice of the appropriate optical thicknesses. Films may also be designed to exhibit a spectral shift in percent reflectance and transmission as a function of entrance angle of incident light. Consequently, visibility of the infrared-reflecting material may differ based on the angle at which the optically active article is viewed. The desired relationship between refractive indices of individual layers can be achieved by selection of appropriate materials and appropriate processing conditions.

Alternatively or in combination, the wavelength-selective film 400 may include a light reflecting or absorbing dye or pigment, such as an infra-red reflecting or absorbing dye. Exemplary descriptions of such dyes may be found in, for example, U.S. Publication No. 2007/0082963. Commercially available infra-red reflecting dyes include, for example, those manufactured by H.W. Sands Corporation of Juniper, Florida, and Epolin Corporation of Newark, N.J. One exemplary advantage of multi-layer optical film usage, especially multi-layer optical films with high visible light transmission, is that unlike near infra-red absorbing dyes, tinting or color change as a function of entrance angle of incident light can be largely avoided or minimized. These light reflecting or absorbing dyes or pigments can be incorporated into the wavelength-selective film 400 by conventional methods such as solution coating or vacuum coating.

In one wavelength, such as a visible wavelength, the transparency of the wavelength-selective film 400 can be >90%, >80%, >70%, >60%, or >50%. In the other wavelength, such as IR, near-IR, or ultraviolet wavelength, the transparency of the wavelength-selective film 400 can be <40%, <30%, <20%, <10%, or <5%.

The substrate 200 chosen for any specific implementation will depend on the desired optical, structural, and durability characteristics. Various materials for substrate 200 will be described below, and these descriptions apply to substrate 220 as well as substrate 240 or any additional substrate, which were described above. Any number of substrates can be used in combination with other substrates to achieve desired characteristics.

As described above the substrate may be optically active. Optically active materials include polarizing, reflective and retroreflective substrates. An optically active material may contain optical elements, such as microstructures, prism, cube corners, microlenses, or glass or ceramic beads.

The term "retroreflective" as used herein refers to the attribute of reflecting an obliquely incident light ray in a direction antiparallel to its incident direction, or nearly so, such that it returns to the light source or the immediate vicinity thereof. Two known types of retroreflective sheeting are microsphere-based sheeting and cube corner sheeting (often referred to as prismatic sheeting). Microsphere-based sheeting, often referred to as "beaded" sheeting, employs a multitude of microspheres typically at least partially embedded in a binder layer and having associated specular or diffuse reflecting materials (e.g., pigment particles, metal flakes, vapor coats) to retroreflect incident light. Illustrative examples are described in, for example, U.S. Pat. No. 3,190,178 (McKenzie), U.S. Pat. No. 4,025,159 (McGrath), and U.S. Pat. No. 5,066,098 (Kult). Cube corner retroreflective sheeting, often referred to as "prismatic" sheeting, comprises a body portion typically having a substantially planar front surface and a structured rear surface comprising a plurality of cube corner elements. Each cube corner element comprises three approximately mutually perpendicular optical faces. Illustrative examples are described in, for example, U.S. Pat. No. 1,591,572 (Stimson), U.S. Pat. No. 4,588,258 (Hoopman), U.S. Pat. No. 4,775,219 (Appledorn et al.), U.S. Pat. No. 5,138,488 (Szczech), and U.S. Pat. No. 5,557,836 (Smith et al.). A seal layer may be applied to the structured surface to keep contaminants away from individual cube corners. Flexible cube corner sheeting, such as those described, for example, in U.S. Pat. No. 5,450,235 (Smith et al.) can also be incorporated in embodiments or implementations of the present application.

In some embodiments, the substrate is not optically active with optical elements as described above, but is a metal, foil, paper, or synthetic film and may be applied to yet another substrate, such as described in FIGS. 5 and 6. The substrate may be a transparent film, that may include materials such a vinyl, urethanes, acrylic, and other films or coatings that provide the desired durability, flexibility, elasticity. In embodiments where it is desired that in the visible light spectrum the wavelength-selective material is transparent, a visibly transparent film should be used. Further, so that the transparent film substrate 200 does not interfere with the detection of the wavelength-selective film 400, the transparent film substrate 200 should also be transparent in the wavelength range that corresponds with the wavelength-selective film 400.

In some embodiments, the substrate is a carrier film that receives the adhesive 300, but then allows for the transfer of the adhesive 300 to yet another substrate. Such a carrier film may be a release liner. The carrier film may be coated with a low adhesion material such that the adhesive 300 has a higher adhesion towards the final desired substrate than to the carrier film. In some embodiment, the low adhesion material is a low surface energy material, such as silicones and fluorinated materials.

The adhesive 300 may be a heat activated adhesive. For example, at certain temperatures the adhesive 300 does not have tack but when brought to an elevated temperature range the adhesive has tack. In one embodiment, at room temperature the heat activated adhesive does not have tack, but becomes tacky at elevated temperatures, such as greater than 33° C., greater than 48° C., or greater than 65° C.

The adhesive 300 may be a pressure sensitive adhesive, which is an adhesive that is permanently tacky at room temperature (such as exhibiting a tensile storage modulus that is less than 0.1 megapascal at 1 hertz at 25° C.), which adheres to a variety of surfaces with light pressure (finger pressure) with no phase change (such as liquid to solid). Exemplary pressure sensitive adhesives include crosslinked (meth)acrylic pressure-sensitive adhesives with or without tackifier. The adhesive 300 may be blends of natural or synthetic rubber and resin, silicone or other polymer systems, with or without additives. The adhesive 300 may comprise a tackifier, plasticizer, crosslinker, or other additives such as antioxidant and ultraviolet light absorbers. In embodiments, where it is desired that in the visible light spectrum the wavelength-selective material is transparent, a visibly transparent adhesive should be used. Further, so that the adhesive 300 does not interfere with the detection of the wavelength-selective film 400, the adhesive 300 should also be transparent in the wavelength range that corresponds with the wavelength-selective film 400.

In one embodiment, the adhesive 300 provides at least 5 ounces per inch (oz/in), 10 oz/in, 15 oz/in, 20 oz/in, 25 oz/in, 35 oz/in, 45 oz/in, 55 oz/in peel adhesion between wavelength-selective film and the substrate.

A lamination process may be used to apply the wavelength-selective material 400 to the adhesive 300 or to apply the adhesive 300 with the wavelength-selective material 400 and substrate 200 to another substrate.

Light directing articles 100 and especially light directing articles 100 that are retroreflective like the ones described herein may be useful in certain machine vision detection and sensing systems. A machine vision detection system collects light from each region of the light directing article with the goal of creating a difference (contrast) between the first area 112 and second area 114. The wavelength-selective material 400 can be arranged in a pattern to create a unique identifier, such as a bar code with encoded data.

As one example, as transportation infrastructure becomes more complicated, vehicles are gaining more driving autonomy. To navigate safely and effectively, sensing modules are increasingly incorporated into these vehicles to perform tasks from parking assistance, self-regulating cruise control and lane deviation warning, to fully autonomous navigation and driving, including collision avoidance and traffic sign interpretation. Camera sensors in combination with wavelength-specific light sources could be used to illuminate a light directing article 100 and detect the pattern formed by the wavelength-selective film 400. Further processing could decode the encoded data from the detected pattern formed by the wavelength-selective material 400. The light in the driving environment can be divided into the following spectral regions: visible light in the region between about 400 and about 700 nm and light outside the visible light region. Existence of a human driver requires certain information to be readable by the driver in the visible light spectrum, but it may also be desirable to have other information not visible to the driver. This can be achieved, for example, by using light outside the visible light region such as infrared light and near-infrared light in the region between about 700 and about 1100 nm. Typical cameras have sensitivity that includes both of these ranges, although the sensitivity of a standard camera system decreases significantly for wavelengths longer than 1100 nm.

In one example, the light directing article 100 is used on a vehicle number plate to include a visibly transparent, machine detectable pattern that conveys information. In one example, the light directing article 100 may be used on a traffic sign, which is an article that conveys information, usually by means of alphanumeric characters, symbols, graphics, or other indicia. It would be advantageous in some applications to use the light directing article 100 to employ the desirable property of viewing indicia without changing the appearance of a signage under visible light. Such retroreflective articles would enable the reading of sign specific information meant for general consumption while avoiding driver or sign reader distraction by and/or unwanted detection of "covert" markings that become viewable with a light source and a detector set in a different wavelength region.

These covert markings could be used for security purposes, identification, navigation, and inventory control. That inconspicuousness can be created with, for example, a visibly clear multi-layer optical film or a multi-layer optical film having a color that approximates the color of the signage substrate. The covert indicia could assist in signage inventory control, as is described in, for example, PCT Publication No. WO 96/35196. For example, the covert indicia could contain signage-specific information such as, for example, signage material lot number, installation date, reorder information, positional information, or product life expectancy. For example, the wavelength-selective film 400 may be arranged in a pattern to provide information such as described in PCT publication 2018/064208; PCT publication 2018/064198; and PCT publication 2018/064212, the disclosures of which are herein incorporated by reference.

A retroreflective highway sign could include visibly transparent and infrared reflecting pattern attached to the retroreflective sheeting portion of the sign. Such attachment could occur, for example, during production, at the time of installation, or after installation. One advantage of such a sign is that the pattern does not interfere with the driver's fast reading of the sign as the driver drives past the sign because the indicia is not visible to the driver. But the indicia can be viewed by highway personnel or machines outfitted with an infrared camera. This identification can be used, for example, for communication of additional information to the vehicle advanced driver assistance systems or for communication of sign management functions such as maintenance requirements, logging of service life, reordering, providing navigation guidance, or to measure sign performance based on the information in the indicia.

Although specific embodiments have been shown and described herein, it is understood that these embodiments are merely illustrative of the many possible specific arrangements that can be devised in application of the principles of the invention. Numerous and varied other arrangements can be devised in accordance with these principles by those of skill in the art without departing from the spirit and scope of the invention. The scope of the present invention should not be limited to the structures described in this application, but only by the structures described by the language of the claims and the equivalents of those structures.

Exemplary Embodiments

1. A process for making a patterned wavelength-selective film comprising:
   providing a substrate;
   providing a wavelength-selective film;
   applying adhesive in a pattern between the substrate and the wavelength-selective film;
   breaking portions of the wavelength-selective film at the adhesive to form patterned portions of the wavelength-selective film on the substrate.
2. The process of embodiment 1, wherein the substrate is an optically active film.
3. The process of any one of the preceding embodiments, wherein the optically active film is a retroreflective film.
4. The process of any one of the preceding embodiments, further comprising applying a transparent layer to the substrate.
5. The process of any one of the preceding embodiments, wherein the patterned portions of the wavelength selective film are between the transparent layer and the substrate.
6. The process of any one of the preceding embodiments, wherein the substrate is a transparent layer applied to a retroreflective film.
7. The process of any one of the preceding embodiments, wherein the adhesive is a heat-activated adhesive or a pressure sensitive adhesive.
8. The process of any one of the preceding embodiments, wherein the substrate is a carrier film and wherein the process further comprises transferring the adhesive from the carrier film to a second substrate.
9. The process of any one of the preceding embodiments, wherein the wavelength-selective film is transparent in the visible light spectrum.
10. The process of any one of the preceding embodiments, wherein the wavelength-selective film reflects, absorbs or scatters in the infrared or near infrared light spectrum.
11. The process of any one of the preceding embodiments, wherein the wavelength-selective film is structurally weak.
12. The process of any one of the preceding embodiments, wherein the adhesion between the wavelength-selective film and the adhesive is a greater force than the force keeping the wavelength-selective film intact.
13. The process of any one of the preceding embodiments, wherein the wavelength-selective film comprises an array of sections with cuts in the wavelength-selective film.
14. The process of any one of the preceding embodiments, wherein the cuts extend partially or entirely through a thickness of the wavelength selective film, and wherein the cuts are continuous or discontinuous along an extending surface of the wavelength-selective film.
15. The process of any one of the preceding embodiments, wherein the wavelength-selective film comprises a transfer stack of layers comprising:
   a release layer compromising a metal layer or doped semi-conductor layer;
   an acrylate layer overlying the release layer;
   a wavelength-selective layer overlying the acrylate layer;
   wherein a release value between the acrylate layer and the metal layer or doped semiconductor layer is from 2 to 50 grams per inch.
16. The process of any one of the preceding embodiments, wherein the patterned adhesive is in a unique pattern.
17. The process of any one of the preceding embodiments, wherein the patterned adhesive is applied to the substrate.
18. The process of any one of the preceding embodiments, wherein the patterned adhesive is applied to the wavelength-selective film.
19. The process of any one of the preceding embodiments, wherein the patterned adhesive is heat activated or a pressure sensitive adhesive.
20. The process of any one of the preceding embodiments, wherein the process further comprises laminating the adhesive to a second substrate.
21. The process of any one of the preceding embodiments, further comprising:
   capturing a continuous edge of the wavelength-selective film with the portions of the wavelength-selective film broken at the patterned adhesive removed.
22. The process of any one of the preceding embodiments, further comprising:
   applying an encapsulation adhesive surrounding the patterned adhesive and wavelength-selective film.

23. A patterned wavelength-selective film comprising:
a substrate;
an adhesive at a first region of the substrate;
array of sections with cuts at least partially through a thickness of a wavelength-selective film at each section secured to the adhesive.

24. The patterned wavelength-selective film of embodiment 23, wherein the substrate is a transparent layer applied to a retroreflective film.

25. The patterned wavelength-selective film of any one of embodiments 23-24, wherein the patterned portions of the wavelength selective film are between the transparent layer and the retroreflective film.

26. The patterned wavelength-selective film of any one of embodiments 23-25, further comprising an encapsulation adhesive surrounding the patterned adhesive and wavelength-selective film.

27. The patterned wavelength-selective film of one of embodiments 23-26, wherein the substrate is a retroreflective film.

28. The patterned wavelength-selective film of any one of embodiment 23-27, wherein the wavelength-selective film is transparent in the visible light spectrum.

29. The patterned wavelength-selective film of any one of embodiments 23-28, wherein the wavelength-selective film reflects, absorbs, or scatters in the infrared or near infrared light spectrum.

30. The patterned wavelength-selective film of any one of embodiment 23-29, wherein the cuts extend partially or entirely through a thickness of the wavelength selective film, and wherein the cuts are continuous or discontinuous along an extending surface of the wavelength-selective film.

31. The patterned wavelength-selective film of any one of embodiment 23-30, wherein the patterned adhesive is in a unique pattern.

32. A patterned wavelength-selective film comprising:
a substrate;
an adhesive at a first region of the substrate;
a wavelength-selective film comprising two opposing surfaces, a first surface on the adhesive;
an acrylate layer aligned on a second surface of the wavelength-selective film.

33. The patterned wavelength-selective film of embodiment 32, wherein the substrate is a transparent layer applied to a retroreflective film.

34. The patterned wavelength-selective film of any one of embodiments 32-33, wherein the patterned portions of the wavelength selective film are between the transparent layer and the retroreflective film.

35. The patterned wavelength-selective film of any one of embodiments 32-34, further comprising an encapsulation adhesive surrounding the patterned adhesive and wavelength-selective film.

36. The patterned wavelength-selective film of one of embodiments 32-35, wherein the substrate is a retroreflective film.

37. The patterned wavelength-selective film of any one of embodiments 32-36, wherein the wavelength-selective film is transparent in the visible light spectrum.

38. The patterned wavelength-selective film of any one of embodiments 32-37, wherein the wavelength-selective film reflects, absorbs, or scatters in the infrared or near infrared light spectrum.

39. The patterned wavelength-selective film of any one of embodiments 32-38, wherein the patterned adhesive is in a unique pattern.

What is claimed is:

1. A process for making a patterned wavelength-selective film comprising:
providing a substrate;
providing a wavelength-selective film;
applying adhesive in a pattern between the substrate and the wavelength-selective film;
breaking portions of the wavelength-selective film at the adhesive to form patterned portions of the wavelength-selective film on the substrate.

2. The process of claim 1, further comprising applying a transparent layer to the substrate.

3. The process of claim 1, wherein the patterned portions of the wavelength selective film are between the transparent layer and the substrate.

4. The process of claim 1, wherein the substrate is a transparent layer applied to a retroreflective film.

5. The process of claim 1, wherein the substrate is a carrier film and wherein the process further comprises transferring the adhesive from the carrier film to a second substrate.

6. The process of claim 1, wherein the wavelength-selective film reflects, absorbs or scatters in the infrared or near infrared light spectrum.

7. The process of claim 1, wherein the wavelength-selective film comprises a transfer stack of layers comprising:
a release layer compromising a metal layer or doped semi-conductor layer;
an acrylate layer overlying the release layer;
a wavelength-selective layer overlying the acrylate layer;
wherein a release value between the acrylate layer and the metal layer or doped semiconductor layer is from 2 to 50 grams per inch.

8. A patterned wavelength-selective film comprising:
a substrate;
an adhesive at a first region of the substrate;
a wavelength-selective film comprising two opposing surfaces, a first surface on the adhesive;
an acrylate layer aligned on a second surface of the wavelength-selective film; and
an encapsulation adhesive surrounding the patterned adhesive and wavelength-selective film.

9. The patterned wavelength-selective film of claim 8, wherein the substrate is a transparent layer applied to a retroreflective film.

10. The patterned wavelength-selective film of claim 9, wherein the patterned portions of the wavelength selective film are between the transparent layer and the retroreflective film.

11. The patterned wavelength-selective film of claim 8, wherein the substrate is a retroreflective film.

12. The patterned wavelength-selective film of claim 8, wherein the wavelength-selective film is transparent in the visible light spectrum.

13. The patterned wavelength-selective film of claim 8, wherein the wavelength-selective film reflects, absorbs, or scatters in the infrared or near infrared light spectrum.

14. The patterned wavelength-selective film of claim 8, wherein the patterned adhesive is in a unique pattern.

* * * * *

UNITED STATES PATENT AND TRADEMARK OFFICE
CERTIFICATE OF CORRECTION

PATENT NO. : 12,001,038 B2
APPLICATION NO. : 17/261983
DATED : June 4, 2024
INVENTOR(S) : Kui Chen-Ho et al.

Page 1 of 1

It is certified that error appears in the above-identified patent and that said Letters Patent is hereby corrected as shown below:

In the Claims

Column 14
Line 30, In Claim 7, delete "compromising" and insert -- comprising --, therefor.

Signed and Sealed this
Third Day of June, 2025

Coke Morgan Stewart
*Acting Director of the United States Patent and Trademark Office*